United States Patent [19]

Soucek et al.

[11] Patent Number: 6,096,437
[45] Date of Patent: Aug. 1, 2000

[54] CERAMER COATING COMPOSITIONS

[75] Inventors: Mark D. Soucek; Chad R. Wold, both of Fargo, N. Dak.

[73] Assignee: NDSU-Research Foundation, Fargo, N. Dak.

[21] Appl. No.: 09/036,063

[22] Filed: Mar. 6, 1998

[51] Int. Cl.[7] .............................. B32B 9/00; C04B 35/48; B05D 3/02
[52] U.S. Cl. ......................... 428/470; 428/697; 501/103; 106/14.23; 106/14.25; 106/14.41; 427/372.2
[58] Field of Search ............................ 106/14.05, 14.41, 106/14.22, 14.23, 14.13, 14.25, 14.31, 287.19; 428/470, 472, 697; 252/387, 388, 396; 427/372.2; 501/12, 103

[56] References Cited

U.S. PATENT DOCUMENTS

| | | | |
|---|---|---|---|
| 5,200,237 | 4/1993 | Sugama | 427/380 |
| 5,288,805 | 2/1994 | Kodali | 525/190 |
| 5,391,210 | 2/1995 | Bilkadi et al. | 51/298 |
| 5,668,203 | 9/1997 | Badesha et al. | 524/265 |
| 5,670,583 | 9/1997 | Wellinghoff | 525/389 |
| 5,677,050 | 10/1997 | Bilkadi et al. | 428/331 |
| 5,814,137 | 9/1998 | Blohowiak et al. | 106/14.13 |
| 5,869,141 | 2/1999 | Blohowiak et al. | 427/309 |

FOREIGN PATENT DOCUMENTS

WO 94/04579   3/1994   WIPO .

OTHER PUBLICATIONS

Atik, M. et al., "Ormocer (ZrO$_2$–PMMA) Films for Stainless Steel Corrosion Protection," *Journal of Sol–Gel Science and Technology*, 8:517–522 (1997).

Brennan, A. B. et al., "Structure–Property Behavior of Novel Ti/Poly(tetramethylene oxide) (PTMO) and Zr/PTMO Hybrid Ceramer Materials Prepared by the Sol Gel Method," *Journal of Inorganic and Organometallic Polymers*, 1(2):167–187 (Jun. 1991).

Chang, T. C. et al., "Characterizatin and degradation of some silicon–containing polyimides," *Polymer Degradation and Stability, Elsevier Pub.*, 161–168 (1997).

Cowan, J. C., Drying Oils, *Dust, Engineering Aspects*, 375–376 (Copyright © 1985 by John Wiley & Sons, Inc.).

Huang, H. et al., Ceramers: Hybrid Materials Incorporating Polymeric/Oligomeric Species with Inorganic Glasses by a Sol–Gel Process 2. Effect of Acid Content on the Final Properties, *Polymer Bulletin*, 14:557–564 (1985).

Iyoku, Y. et al., "The preparation of poly(methylsilsesquioxane) network–polyimide hybrid materials by the sol–gel process and their properties," *High. Perform. Polym.* 6:43–52 (1994).

McMillan, P.W., Glass–Ceramics, Academic Press Inc., New York, NY, p. 84 (1979).

Sailer, R. A. et al., "Production and Evaluation of Ceramers Based on Crambe Oil and Tetraethyl Orthosilicate," *Polymer Preprints*, 36(2):340–341 (Aug. 1995).

Sugama, T. et al., "Polymetallosiloxane Coatings Derived From Two–Step, Acid–Base Catalyzed Sol Precursors for Corrosion Protection of Aluminum Substrates," *Journal of Coatings Technology*, 65(826):27–36 (Nov. 1993).

Sugama, T. et al., "Polytitanosiloxane Coatings Derived From Ti(OC$_2$H$_5$)$_4$–Modified Organosilane Precursors," *Progress in Organic Coatings*, 18:173–196 (1990).

Tuman, S. J. et al., "Novel Inorganic/Organic Coatings Based on Linseed Oil and Sunflower Oil with Sol–Gel Precursors," *Journal of Coatings Technology Reprint*, 68(854):9 pgs (Mar. 1996).

Tuman, S. J. et al., "Differential scanning calorimetry study of linseed oil cured with metal catalysts," *Progress in Organic Coatings*, 28:251–258 (1996).

Tuman, S. J. et al., "Novel Inorganic/Organic Hybrid Materials Based on Drying Oils with Sol–Gel Precursors," *Polymer Preprints*, 36(2):336–337 (Aug. 1995).

Tuman, S. J. et al., "Structure–Property Behavior of Inorganic/Organic Hybrid Materials with Acid Catalyzed Sol–Gel Reactions," *Polymer Preprints*, 36(2):338–339 (Aug. 1995).

Tuman, S. J. et al., "Differential Scanning Calorimetry Study of Linseed Oil Cured with Metal Catalysts," *Polymer Preprints*, 36(2):380–381 (Aug. 1995).

Wang, B. et al., "New Ti–PTMO and Zr–PTMO Cermer Hybrid Materials Prepared by the Sol Gel Method Synthesis and Characterization," *Journal of Polymer Science: Part A: Polymer Chemistry*, 29:905–909 (1991).

Wold, C. R. et al., "Novel Inorganic/Organic Ceramer Coatings," *Polymer Preprints*, 37(2):309–310 (Aug. 1996).

*Primary Examiner*—Deborah Jones
*Assistant Examiner*—Stephen Stein
*Attorney, Agent, or Firm*—Merchant & Gould P.C.

[57] ABSTRACT

A ceramer precursor coating composition capable of being formed into ceramer coatings having high tensile modulus and tensile strength while retaining a relatively low strain-at-break are provided. The ceramer precursor coating composition includes unsaturated oil stock and sol-gel precursor. The sol-gel precursor includes a mixture of at least two sol-gel precursor species which are based on different metal atoms. An article having at least one surface coated with a ceramer coating formed from the inorganic/organic coating composition is also provided.

27 Claims, No Drawings

CERAMER COATING COMPOSITIONS

Government Support

This invention was made with government support under grant No. 95-375000-2053 from the U.S. Department of Agriculture. The government has certain rights in the invention.

BACKGROUND OF THE INVENTION

Drying oils are among the oldest binders used in paints and are still used today as raw materials in alkyd resins, epoxy esters, and uralkyds. Naturally occurring drying oils are triglycerides consisting of glycerol esters of a mixture of saturated fatty acids and unsaturated fatty acids such as oleic, linoleic, and linolenic fatty acids. These triglycerides are known to react with molecular oxygen via an auto-oxidative crosslinking reaction to form a coating. Metal catalyst known as driers can be added to accelerate the drying process. The metal catalysts can promote the formation of peroxide radicals which initiate the auto-oxidative process.

Drying oils crosslink through unsaturated fatty acid residues via an auto-oxidative process. Typically, the auto-oxidative process is separated into three steps; initiation, propagation, and termination. In the initiation step, naturally present hydroperoxides decompose forming free radicals. These free radicals have high reactivity toward antioxidants which form peroxy free radicals. As the concentration of antioxidants decrease, propagation proceeds by abstraction of hydrogen atoms on methylene groups between double bonds forming free radical. These free radicals can react with oxygen forming a conjugated peroxy free radical. Regeneration of free radicals can proceed by abstracting additional hydrogen atoms from other doubly allylic methylene groups. Crosslinking can then occur by radical-radical combination forming carbon-carbon, ether and peroxide bonds.

Many attempts have been made to develop novel inorganic/organic materials. One successful method developed in the past decade involves in situ polycondensation of metal alkoxides in organic polymer matrices via a sol-gel process. The sol-gel process of metal alkoxides permits low temperature synthesis while yielding high purity homogenous ceramic-type materials. Initial hydrolysis of the metal alkoxides typically occurs when an inorganic molecule reacts with water to form a partially hydrolyzed complex. The curing process continues as molecules with various degrees of hydrolysis react via polycondensation. Ultimately, the polycondensation results in a three-dimensional mixed metal oxide/hydroxide/alkoxide clusters.

The characteristics of ceramic materials utilizing the sol-gel process have been investigated as corrosion-protective coatings on metal substrates. Numerous papers have indicated their unique ability to protect metal substrates by acting as a barrier coating. In addition, ceramic coatings have been indicated to protect metal substrates by covalent interaction with the oxide layer present at the metal substrate surface. However, it should be emphasized that until the recent development of the sol-gel process, substrates such as aluminum with a low melting point could not be coated with ceramics due to the high temperatures required by conventional methods of ceramic film formation. The sol-gel process allows one to obtain ceramic films at lower temperatures.

More recently inorganic/organic hybrid coatings have been reported utilizing drying oils and sol-gel precursors. The seed oil was mixed with a metal alkoxide and the resulting inorganic/organic hybrid coatings cured via concomitant reactions in the inorganic and organic phases. Investigation of the inorganic/organic hybrid coatings as a function of sol-gel precursor, sol-gel concentration, and type of drying oil found that hardness, and adhesion significantly increased with increasing sol-gel precursor content. Overall, the inclusion of sol-gel precursors such as $Ti(O-i-Pr)_4$ in drying oil based coatings, however, decreased impact resistance and flexibility in comparison to the corresponding linseed oil and sunflower oil coatings.

SUMMARY OF THE INVENTION

The present invention relates to a ceramer precursor coating composition which can be used to form ceramer coatings having high tensile modulus and tensile strength while exhibiting a relatively moderate strain-at-break values. The ceramer precursor coating composition includes; (i) unsaturated oil stock, and (ii) sol-gel precursor which includes a mixture of at least two different sol-gel precursor species. The sol-gel precursor typically includes two species which have different metal atoms, e.g., a mixture which contains at least one titanium sol-gel precursor species and at least one zirconium sol-gel precursor species.

Mixing sol-gel precursors, such as metal alkoxides, with an unsaturated oil stock (e.g., linseed oil) can enhance the mechanical properties of the resulting coating relative to pure unsaturated oil stock coatings. For example, the presence of $Ti(O-i-Pr)_4$ and $Zr(O-n-Pr)_4$ at low concentrations can increase the film hardness, impact resistance, tensile strength, and tensile modulus of linseed oil based coatings. The inclusion of the $Ti(O-i-Pr)_4$: $Zr(O-n-Pr)_4$ mixture can also enhance the pencil hardness of an oil stock based coating while maintaining desirable flexibility and adhesion properties. Moreover, electrochemical impedance spectroscopy suggests the addition of metal alkoxides to an unsaturated oil stock such as linseed oil can dramatically increase the anticorrosive properties of the coating.

The present invention also relates to articles which have at least one surface coated with a ceramer coating formed from the present coating composition. Typical substrates which may be coated with said ceramer coating include metals, metal oxides and ceramic materials. After the coating composition is applied to a substrate surface to form a film of desired thickness, the film is typically cured to form a ceramer coating by heating at a relatively low temperature. For example, the Ti/Zr/linseed oil coatings described herein can be cured to form a ceramer by progressively heating the coating up to about 200–250° C.

DETAILED DESCRIPTION OF THE INVENTION

The present invention relates to ceramer precursor coating compositions which include unsaturated oil stock and sol-gel precursor which includes a mixture of at least two different sol-gel precursor species. Examples of suitable mixed metal sol-gel precursors include mixtures which contain at least one titanium sol-gel precursor and at least one zirconium sol-gel precursor. The present ceramer precursor coating compositions are capable of being cured to form ceramer coatings which have high tensile modulus and/or high tensile strength while exhibiting a relatively moderate strain-at-break.

As employed herein, the term "unsaturated oil stock" refers to a material made up of one or more polyol fatty acid esters. Typically the individual molecules which make up the unsaturated oil stock include at least three fatty acyl chain esterified to alcohol groups of an aliphatic polyol. Suitable examples include triacylgycerols as well as fatty acid polyesters of polyols such as pentaerythritol, dipentaerythritol, sorbitol, poly(vinyl alcohol), poly(allyl alcohol), α-methyl-O-glucosides, and trimethylolalkanes (e.g., trimethylolethane and trimethylolpropane). A substantial portion of the fatty acid chains of the polyol esters include one or more unsaturated carbon-carbon double bonds.

The mixture of fatty acids isolated from complete hydrolysis of an oil stock from a specific source is generally referred to as a "fatty acid composition." By the term "fatty acid composition" reference is made to the identifiable fatty acid residues corresponding to the fatty acid chains in the various polyesters present in the oil stock. In general, oils extracted from any given plant or animal source are made up of a mixture of triacylglycerols, characteristic of the specific source. The distribution of specific identifiable fatty acids is typically characterized by the amounts of the individual fatty acids as a weight percent of the total mixture of fatty acids obtained from hydrolysis of the particular oil stock.

For example, a typical fatty acid composition of soybean oil ("SBO") is as shown in Table I below.

TABLE I

Typical SBO Fatty Acid Composition

| Fatty acid | Weight Percent[1] |
|---|---|
| Palmitic acid | 10.5 |
| Stearic acid | 4.5 |
| Oleic acid | 23.0 |
| Linoleic acid | 53.0 |
| Linolenic acid | 7.5 |
| Other | 1.5 |

[1]Weight percent of total fatty acid mixture derived from hydrolysis of soybean oil.

Palmitic and stearic acids are saturated fatty acids and triacylglycerol acyl chains formed by the esterification of either of these acids do not contain any double carbon-carbon bonds. However, many fatty acids such as oleic acid, linoleic acid and linolenic acid are unsaturated. Oleic acid is an 18 carbon fatty acid with a single double bond; linoleic acid is an 18 carbon fatty acid with two double bonds or points of unsaturation; and linolenic is an 18 carbon fatty acid with three double bonds. More specifically, oleic acid is (Z)-9-octadecanoic acid;

linoleic acid is (Z,Z)-9,12-octadecadienoic acid;

α-linolenic acid is (Z,Z,Z)-9,12,15-octadecatrienoic acid; and

γ-linolenic acid is the (Z,Z,Z)-6,9,12 isomer of octadecatrienoic acid.

The oil stock portion of the present coating compositions generally contains a substantial amount of a highly unsaturated oil stock. Preferably, the oil stock includes a substantial number of fatty acyl chains with a degree of unsaturation rendering them susceptible to cross linking reactions. The degree of unsaturation of an oil stock and its related propensity to form a cross-linked polymer film can be characterized in a number of different manners. Useful characterizations of the unsaturation of an oil stock include the drying index, unsaturation index, Iodine Value, and percentage of particular polyunsaturated fatty acid(s) in the corresponding fatty acid composition (e.g., % linolenic acid). As used herein, polyunsaturated fatty acids are fatty acid having three or more unsaturated carbon-carbon bonds.

As referred to herein, the term "drying index" for a unsaturated oil stock is defined as:

Sum over n of (n×( wt. % Fatty Acids having n+1 double bonds))

where n is a positive integer. The "wt. % Fatty Acids" refers to the wt. % of fatty acids having the specified number of double bonds as a percentage of the total weight of the fatty acid composition of the oil stock. For example, the drying index of soybean oil which contains 53.0 wt. % linoleic acid and 7.5 wt. % linolenic acid would be:

(53.0 wt. % linoleic acid+2×( 7.5 wt. % linolenic acid) )=68

The present coating compositions typically include an unsaturated oil stock having a drying index of at least about 65. Preferably, the unsaturated oil stock has a drying index of at least about 70, and more preferably at least about 85. Oil stocks with a drying index of 70 or higher are commonly referred to as "drying oils."

Examples the unsaturated oil stock suitable for use in forming the present coating compositions include linseed oil, tung oil, perilla oil, sunflower oil, soybean oil, fish oil, dehydrated castor oil, and mixtures thereof. Other suitable unsaturated oils include polyesters formed from polyols such as pentaerythritol, dipentaerythritol, sorbitol, poly (vinyl alcohol), poly(allyl alcohol), α-methyl-O-glucosides, and/or trimethylolalkanes and a fatty acid mixture having a suitable level of unsaturation (as discussed herein).

As referred to herein, the average number of unsaturated carbon-carbon bonds per fatty acyl chain present in an unsaturated oil stock is referred to herein as the "unsaturation index". The unsaturation index of an oil may be calculated based from the distribution of fatty acids in the mixture produced by hydrolysis of the polyol esters. The distribution of fatty acids in a particular oil may be readily determined by methods known to those skilled in the art. Unsaturated triacylglycerol oils which are particularly suitable for use as drying oils in the present methods typically have an unsaturation index of at least about typical 1.5 and, preferably about 1.8 to about 3.0.

Another measure of characterizing the amount of unsaturated carbon-carbon bonds present in an unsaturated oil stock is its Iodine Value. The Iodine Value of an unsaturated oil stock, such as a mixture of triacylglycerols, is determined by the Wijs method (A.O.C.S. Cd 1–25). The present compositions typically employ drying oils, such as vegetable oil stocks having an Iodine Value of at least about 130. Preferably the unsaturated oil stock employed in the present coating composition has an Iodine Value of at least about 140 and, more preferably, about 160 to about 200.

Yet another manner of characterizing the propensity of an oil stock to form a cross-linked polymer film is based on the percentage of particular polyunsaturated fatty acid(s) in the corresponding fatty acid composition. For example, typical drying oils suitable for use in the present composition include at least about 25% linolenic acid and/or at least about 60% linoleic acid. Drying oils which include at least about 40% linolenic acid are particularly suitable for use as the unsaturated oil stock in the present compositions.

The sol-gel precursor in the present coating compositions typically includes a mixture of at least two sol-gel precursor species each of which includes a different metal atom. Examples of suitable sol-gel precursors include mixture containing at least one titanium sol-gel precursor and at least one zirconium sol-gel precursor. Ceramers formed from mixed metal systems of this type tend to exhibit a better overall combination of strength, toughness and flexibility characteristics in comparison to ceramers formed from precursor formulations having only a single metal sol-gel precursor.

The present coating compositions preferably include one or more titanium alkoxide sol-gel precursors such as a titanium alkoxide or a titanium (dialkoxide)bis (acetylacetonate). The alkoxide groups in the sol-gel precursors are typically lower alkoxides (i.e., $C_1$–$C_6$ alkoxides) and, preferably, $C_2$–$C_4$ alkoxides. Examples of particularly suitable titanium sol-gel precursors for use in the present compositions include titanium tetraisopropoxide (Ti(O-i-Pr)$_4$) and titanium di(isopropoxide)-bis (acetylacetonate) (Ti(O-i-Pr)$_2$(acac)$_2$).

While the inclusion of a titanium sol-gel precursor in a ceramer precursor formulation can enhance the tensile strength and tensile modulus of a ceramer formed from the coating, it has been found that the additional inclusion of a zirconium sol-gel precursor can enhance the overall combination of physical properties of the resulting ceramer. The zirconium sol-gel precursor includes at least one zirconium alkoxide, such as a zirconium tetraalkoxide. As with the titanium alkoxides, the alkoxide group in the zirconium alkoxide is typically a lower alkoxide (i.e., a $C_1$–$C_6$ alkoxide) and, preferably, a $C_2$–$C_4$ alkoxide. The zirconium alkoxide preferably includes a zirconium tetrapropoxide, such as zirconium tetra-n-propoxide (Zr(O-n-Pr)$_4$).

The physical properties of the ceramer formed from the present coating compositions are influenced by the total amount sol-gel precursor as well as the ratio of the various sol-gel precursor species present in the formulation. Typically, the composition includes at least about 80 wt. % and, preferably, at least about 90 wt. % unsaturated oil stock. The sol-gel precursor generally makes up no more than about 12 wt. % of the formulation. Preferred embodiments of the coating composition include about 3 to about 10 wt. % of a mixture of titanium sol-gel precursor and zirconium sol-gel precursor.

The titanium sol-gel precursor and the zirconium sol-gel precursor are typically present in the formulation in a wt. ratio of about 10:1 to about 1:5. Preferred versions of the coating formulation about a 5:1 to about 1:2 wt. ratio of titanium sol-gel precursor species to zirconium sol-gel precursor species. Examples of suitable sol-gel precursors which may be included in the present formulations include titanium alkoxide and zirconium alkoxide in a wt. ratio of about 3:1 to about 1:2. Preferred coating compositions include about 3–10 wt. % sol-gel precursor made up of a mixture of Ti(O-i-Pr)$_4$ and Zr(O-n-Pr)$_4$, preferably in a wt. ratio of about 3:1 to about 1:1. Other suitable sol-gel precursors include mixtures of Ti(O-i-Pr)$_2$(acac)$_2$ and Zr(O-n-Pr)$_4$.

The present ceramer precursor coatings can be applied and cured using standard methods well known to those skilled in the art. The coating compositions are typically applied at a specified thickness (e.g., about 0.010 mm to about 0.20 mm wet film thickness) onto the surface of a substrate using a drawdown bar or similar method of application. The resulting film of the ceramer precursor coating on the substrate can be cured conveniently into a ceramer by heating the coated substrate up to the desired final curing temperature over a period of time. Final cure temperatures of about 180–250° C. are typically sufficient to satisfactorily cure the present coating formulations into a ceramer with a convenient period of time (e.g., within a period of several hours). For example, linseed oil based coating containing a mixed Ti alkoxide/Zr alkoxide sol-gel precursor may be cured by heating a coated substrate up to a final cure temperature of about 250° C. in stages, e.g., over a period of two to four hours. The initial heating at relatively low temperatures allows more volatile side products, such as the lower alcohols generated as side products when a metal alkoxide is baked, to escape without damaging the developing ceramer structure. The present coating compositions can be cured without heating, e.g., by allowing substrate surface coated with a thin film of the composition to stand at room temperature for several days in contact with an oxygen-containing atmosphere such as air.

Alternately, the cure rate and time required to cure the composition can be affected by the amount(s) of water and/or acid or base present in the formulation. The presence of minor amounts of water can greatly influence the rate and course of the reaction. For example, the addition of about 0.2 wt. % water to the present coating composition generally accelerates the rate of reaction of the sol-gel precursors present in the composition. The addition of minor amounts of acid or base can have a similar effect on the curing of thin films of the present composition.

The present ceramer precursor coating compositions are capable of being cured to form ceramer coatings having a number of desirable physical properties. Unsaturated oil stock-based coatings which include a mixed titanium/zirconium sol-gel precursor can be cured to form flexible, adherent ceramer coatings which are tough and resilient. The ceramer coatings formed from such coating compositions can have a tensile strength of at least about 8 MPa and/or a tensile modulus of at least about 50 MPa. Preferably, the present ceramer precursor compositions are capable of forming a ceramer coating having a tensile modulus of at least about 100 MPa and, more preferably, at least about 200 MPa. Ceramer coatings formed from preferred versions of the present ceramer precursor compositions can have a tensile strength of at least about 10 MPa.

The present ceramer precursor compositions are capable of forming a ceramer coating having a strain-at-break of about 15% or higher. Preferred versions of the present compositions are capable forming a ceramer coating having a strain-at-break of at least about 20% and, more preferably, at least about 40%.

For example, ceramer precursor coatings based on a mixed titanium/zirconium sol-gel precursor and an unsaturated oil stock, such as linseed oil, can produce ceramer coatings having a tensile modulus of at least about 100 MPa and, preferably, about 200 MPa or higher. Ceramers formed from such coatings can also have a tensile strength of about 10 MPa or above. The strong, tough ceramers produced by such coatings are also typically quite flexible. The ceramers typically have a strain-at-break of at least about 15% and a flexibility as measured by conical mandrel flexibility of no more than about ¼" diameter.

Ceramer coatings which are quite hard and resistant to impact can be formed from the present compositions. Unsaturated oil based coatings which include a mixed metal sol-gel precursor, such as a mixed Ti/Zr system, can be used to form ceramers having a reverse impact resistance of at least about 20 in-lb and/or a pencil hardness of at least about 6H. Preferred versions of ceramers formed from the present compositions can have reverse impact resistance of about 30 in-lb or higher.

The ceramer coatings formed from the present mixed metal sol-gel precursor/unsaturated oil systems generally exhibit excellent adhesion properties to metal and ceramic substrates. For example, X-hatch adhesions of about 90% or above are commonly observed with unsaturated oil-based formulations which include a mixed Ti/Zr sol-gel precursor.

The invention will be further described by reference to the following detailed examples. The examples are meant to provide illustration and should not be construed as limiting the scope of the present invention.

EXAMPLES

The following nomenclature is employed herein to refer to the ceramer precursor compositions described in this application. The first term, LIN, defines linseed oil as the seed oil used in this study. The second term designates the metal alkoxides(s) present in the coating. The number(s) in parentheses quantifies the weight fraction of metal alkoxide (s) relative to the drying oil content and a colon signifies two metal alkoxides present at different weight fractions in the coating.

The following abbreviations are used herein in referring to the various components of the ceramer precursor compositions and the ceramer coating formed therefrom:

"TIP"—titanium (IV) i-propoxide ($Ti(O-i-Pr)_4$);
"TIA"—titanium (di-i-propoxide)bis(acetylacetonate) ($Ti(O-i-Pr)_2(acac)_2$);
"ZrP"—zirconium n-propoxide ($Zr(O-n-Pr)_4$);
"ZnAc"—zinc acetate dihydrate ($Zn(Ac)_2 \cdot 2H_2O$); and
"LIN"—linseed oil.

Example 1

The effects of mixed metal alkoxide sol-gel precursors within a linseed oil coating was investigated. Two titanium sol-gel precursors, titanium (IV) i-propoxide ($Ti(O-i-Pr)_4$), and titanium (di-i-propoxide)bis(acetylacetonate) ($Ti(O-i-Pr)_2(acac)_2$) were mixed with a zirconium sol-gel precursor, zirconium n-propoxide ($Zr(O-n-Pr)_4$), in a 1:1 weight ratio prior to addition to linseed oil. The objective of the study was to ascertain whether a beneficial synergistic affect could be observed when a mixture of these metal oxides were employed as the inorganic phase.

The linseed oil used in this work was obtained from commercial sources (Cargill, Inc. and Frost Paint and Oil Corp.). The titanium (IV) i-propoxide, titanium (di-i-propoxide) bis(acetylacetonate), and zirconium n-propoxide were obtained from Strem Chemicals. The chemicals were used as is without further purification.

The chemical composition of the coatings was varied in a systematic fashion by altering the metal alkoxide to seed oil ratio. The coating samples were prepared by mixing the linseed oil with various sol-gel precursors in the specified amounts (wt. % basis). The samples were then allowed to mix for 6–9 h. The coatings were then cast at a specified thickness (typically 0.075 to 0.15 mm) using a drawdown bar on 0.6 mm aluminum panels or Pyrex sheets. The wet coatings were placed in a dust free environment at room temperature for 24 h. The cure cycle of the coatings was as follows: one hour at 130° C., one hour at 180° C., and one hour at 210° C. The coatings were then allowed to slowly cool to room temperature. Coated aluminum panels produced in this manner were used to evaluate adhesion, corrosion resistance, hardness, impact resistance, and flexibility. The coatings cast on Pyrex sheets were removed as free-standing films and used to evaluate tensile strength, strain-at-break and tensile modulus.

Mechanical coating tests performed on the various ceramer coated samples included pencil hardness (ASTM D3363), conical mandrel flexibility (ASTM D522), crosshatch adhesion (ASTM D3359), and reverse impact resistance (ASTM D2794-84). Tensile measurements were obtained on an Instron Universal Tester Model 1000. The dimensions of the films tested were 0.05–0.10 mm in thickness, 15–17 mm wide, and an initial length of 50 mm. A crosshead speed of 10 mm/min was used to determine strain-at-break, tensile modulus, and tensile strength. Six samples were tested for each coating and an average value was reported.

The effects of titanium alkoxides in linseed oil-based coatings have been studied using differential scanning calorimetry. Similar to a conventional through drier, the titanium alkoxides, $Ti(O-i-Pr)_4$ and $Ti(O-i-Pr)_2(acac)_2$, shifted a single reaction exotherm to lower and broader temperatures as the sol-gel precursor content was increased up to 5 wt. %. It was concluded that the titanium-oxo clusters catalyzed the auto-oxidative drying process. Based on this conclusion, it was surmised that mixed metal-oxo clusters could be catalytically active as well. The enhancement of the mechanical properties in the mixed metal ceramer coatings reported herein supports this hypothesis.

The cured ceramer coatings were compared in terms of adhesion, hardness, impact resistance, flexibility, and corrosion resistance. Table I and II outlines the mechanical coatings properties of a number of linseed oil-based coatings as a function of metals alkoxide content. By mixing the titanium and/or zirconium alkoxides at a 1:1 ratio with linseed oil, it was observed that mechanical properties increased, including flexibility, and impact resistance. It has been reported that mixtures of two oxides can improve nucleation by the formation of regions of longer range atomic order than are normally present in the liquid phase. In addition, it was also observed that the mixture of $Ti(O-i-Pr)_4$ and $Zr(O-n-Pr)_4$ at a 1:1 ratio enhanced the pencil hardness while maintaining flexibility, and adhesion properties.

Example 2

As a control study, low concentrations of zinc acetate dihydrate ($Zn(Ac)_2 \cdot 2H_2O$), an anticorrosive agent, were added to pure linseed oil. It was observed that the $Zn(Ac)_2 \cdot 2H_2O$ did not dissolve within the linseed oil, generating a phase separated heterogeneous film. When the sol-gel precursors were added to linseed oil with the $Zn(Ac)_2 \cdot 2H_2O$, however, the mixture was homogeneous. This is possibly due to the presence of water in $Zn(Ac)_2 \cdot 2H_2O$. The presence of water with the sol-gel precursor can promote hydrolysis, forming three-dimensional mixed metal oxide clusters.

The $Zn(Ac)_2 \cdot 2H_2O$ was added to various ceramer coating at concentrations ranging from 0.5 to 1.5 wt. %. The sol-gel precursors used for this part of this study ranged from 5 to 10 wt. % $Ti(O-i-Pr)_4$, $Ti(O-i-Pr)_2(acac)_2$, or $Zr(O-n-Pr)_4$. The zirconium metal alkoxide ceramer coatings afforded exceedingly poor mechanical properties, and a result, were not investigated further. For the titanium based ceramer coatings, concentration greater than 1.5 wt. % $Zn(Ac)_2 \cdot 2H_2O$ in a linseed oil-based ceramer coating created solubility problems which resulted in phase separation. A 1:1 ratio of $Ti(O-i-Pr)_4$, and $Zr(O-n-Pr)_4$ in a linseed oil-based coating with $Zn(Ac)_2 \cdot 2H_2O$ was also evaluated but, inadequate mechanical properties were obtained with the particular mixture studied.

The highest pencil hardness of 9H was obtained by adding 0.5 wt. % $Zn(Ac)_2 \cdot 2H_2O$ to a linseed oil-based coating with either a 10 wt. % $Ti(O-i-Pr)_4$, or 10 wt. % $Ti(O-i-Pr)_2(acac)_2$. Impact resistance also increased dramatically when small concentrations of $Zn(Ac)_2 \cdot 2H_2O$ was introduced into these ceramer systems. A systematic increase was observed in impact resistance when 0.5 to 1.5 wt. % of $Zn(Ac)_2 \cdot 2H_2O$ was added to linseed-based coating with 10 wt. % $Ti(O-i-Pr)_4$. The impact resistance of the hybrid coating (reverse impact values of 58 in·lbs and 40 in·lbs, respectively) were substantially higher than that of pure linseed oil coatings.

A preliminary study of the corrosion resistant properties of these hybrid ceramer coatings were evaluated. The barrier properties were observed using Electrochemical Impedance Spectroscopy (EIS) in which the hybrid ceramer and pure linseed oil films on aluminum substrates were tested. The ceramer coating of 10 wt. % Ti(O-i-Pr)$_4$, and 0.5 wt. % Zn(Ac)$_2$•2H$_2$O in linseed oil was chosen as the first coating to be evaluated. It was observed that this ceramer coating dramatically outperformed the pure linseed oil coating in terms of corrosion resistance. The pure linseed oil coatings failed within 20 days, while the ceramer coating maintained sufficient barrier properties through at least 120 days.

Example 3

In another set of experiments, two sol-gel precursors, titanium (IV) i-propoxide (Ti(O-i-Pr)$_4$), and zirconium n-propoxide (Zr(O-n-Pr)$_4$) were incorporated together into linseed oil to form a coating composition. The coating composition was varied by the ratio of the sol-gel precursors to linseed oil content. Two sets of mixtures of metal oxide precursors were studied; (i) Ti(O-i-Pr)$_4$ and Zr(O-n-Pr)$_4$ at a 1:1 wt. % ratio in linseed oil; and (ii) 5 wt. % Ti(O-i-Pr)$_4$ with 1–5 wt. % Zr(O-n-Pr)$_4$ in linseed oil. The resulting inorganic/organic hybrid coatings were cured via concomitant reactions in the inorganic and organic phases using the procedure described in Example 1. Various coatings properties such as adhesion, hardness, impact resistance, flexibility, and tensile properties were investigated as a function of sol-gel precursor(s) type and content using the procedures described in Example 1. In addition, electrochemical impedance spectroscopy (EIS) was used to evaluate the corrosion properties of a representative mixed metal oxide inorganic/organic coating. The linseed oil (obtained from Archer Daniel Midland Corp.), titanium (IV) i-propoxide and zirconium n-propoxide (obtained from Strem Chemicals) were used as received without further purification.

Two series of mixed metal ceramer films were prepared. In the first series a titanium sol-gel precursor, titanium (IV) i-propoxide, was mixed with a zirconium sol-gel precursor, (Zr(O-n-Pr)$_4$), in a 1:1 wt. % ratio prior to addition to linseed oil. In the second series, 5 wt. % Ti(O-i-Pr)$_4$ was mixed with 1–5 wt. % Zr(O-n-Pr)$_4$ prior to addition to the linseed oil.

The sol-gel precursors used for the study ranged from 5 to 10 wt. % Ti(O-i-Pr)$_4$ or Zr(O-n-Pr)$_4$. The zirconium metal alkoxide ceramer coatings did not provide adequate mechanical properties and as a result, were not investigated further. For the titanium based ceramer coatings, concentration greater then 1 wt. % Zn(Ac)$_2$•2H$_2$O in a linseed oil-based ceramer coating created solubility problems which resulted in phase separation.

The chemical composition of the coatings was varied in a systematic fashion by altering the metal alkoxide(s) to seed oil ratio. The coatings were compared in terms of adhesion, hardness, impact resistance, flexibility, tensile properties, and corrosion resistance. Table IV outlines the mechanical properties of the linseed oil-based coatings which included a single metal alkoxide. A systematic increase in pencil hardness was observed when the Ti(O-i-Pr)$_4$ or Zr(O-n-Pr)$_4$ concentrations were increased. The maximum pencil hardness value of 6H was obtained when a 10 wt. % Ti(O-i-Pr)$_4$ loading was used. However, the highest pencil hardness for Zr(O-n-Pr)$_4$ (1H) was obtained with 5 wt. % loading. Concentrations of Zr(O-n-Pr)$_4$ higher than 5 wt. % could not be evaluated due to film formation difficulties. Both Ti(O-i-Pr)$_4$, or Zr(O-n-Pr)$_4$ based ceramer coatings were considerably more flexible (as measured by conical mandrel flexibility) at low concentrations and then diminished at higher sol-gel precursor concentrations. Surprisingly, neither the Ti(O-i-Pr)$_4$, or Zr(O-n-Pr)$_4$ based ceramer coatings showed any major diminution in impact resistance with increasing sol-gel precursor. The highest impact resistance values of 25 and 40 in-lb were found for a 2 wt. % Ti(O-i-Pr)$_4$ and 1 wt. % Zr(O-n-Pr)$_4$ loading, respectively. In terms of adhesion, the Ti(O-i-Pr)$_4$ (4B) based ceramer coatings exhibited substantially better adhesion than the Zr(O-n-Pr)$_4$ (1B–2B).

Table V shows the mechanical properties of linseed oil based coatings as a function of mixed metal alkoxide content. Overall, the mixed metal oxide coatings performed significantly better than the coatings described in Table IV. The highest pencil hardness value of 7H were obtained with 10 wt. % of a 1:1 Ti(O-i-Pr)$_4$: Zr(O-n-Pr)$_4$ mixture, and 5:3 wt. % or 5:4 wt. % Ti(O-i-Pr)$_4$:Zr(O-n-Pr)$_4$ loading. The highest impact resistance values were observed with 1 wt. % of a Ti(O-i-Pr)$_4$:Zr(O-n-Pr)$_4$ mixture (32 in-lb), and a 5:1 wt. % Ti(O-i-Pr)$_4$:Zr(O-n-Pr)$_4$ loading (34 in-lb). The Ti(O-i-Pr)$_4$:Zr(O-n-Pr)$_4$ based ceramer coatings exhibited excellent adhesion properties in all specimens tested (4B–5B). The flexibility for the Ti(O-i-Pr)$_4$:Zr(O-n-Pr)$_4$ ceramer coatings performed considerably well at low concentrations but decreased from 1/8" to 1/4" conical mandrel flexibility at higher concentrations.

To better understand the final films chemical composition, the coatings were evaluated as a function of titanium concentration. The percent of titanium in the final films were investigated using induced chemical plasma (ICP). The percentage of titanium was found to be stoichiometric with respect to the sol-gel precursor added. During the curing cycle the metal alkoxide condenses into metal-oxo clusters. The inorganic phase of the hybrid films were also investigated by wide angle x-ray (WAX), but unfortunately, the crystalline domains were too small for evaluation.

Table VI shows the tensile strength, strain-at-break, and tensile modulus of linseed oil-based coatings as a function of Ti(O-i-Pr)$_4$ content. As an overall tend, the tensile strength increased with increasing Ti(O-i-Pr)$_4$ concentration. The highest tensile strength of 5.0 MPa was observed at a 10 wt. % Ti(O-i-Pr)$_4$ loading. Conversely, the strain-at-break decreased as Ti(O-i-Pr)$_4$ concentration increased. The tensile modulus followed a similar trend exhibited by the tensile strength in which a systematic increase was observed as a function of Ti(O-i-Pr)$_4$ concentration. Similar to the tensile strength, the highest tensile modulus (33 MPa) was attained with a 10 wt. % Ti(O-i-Pr)$_4$ loading. Coatings with higher concentrations of Ti(O-i-Pr)$_4$ yielded inconsistent film formation mainly due to pregelation prior to casting.

Table VII shows the tensile strength, strain-at-break, and tensile modulus of linseed oil-based coatings a function of Zr(O-n-Pr)$_4$ content. The tensile strength, strain-at-break, and tensile modulus followed similar trends found with the Ti(O-i-Pr)$_4$ based ceramer coatings. However, the values were much lower when Zr(O-n-Pr)$_4$ was used as the sole metal alkoxide. The maximum tensile strength and tensile modulus were obtained when the Zr(O-n-Pr)$_4$ content was 5 wt. % relative to linseed oil. Loading greater than 5 wt. % Zr(O-n-Pr)$_4$ tended to yield poor film formation due to rapid gelation.

Table VIII shows the tensile strength, strain-at-break, and tensile modulus of linseed oil-based coatings as a function of a series of Ti(O-i-Pr)$_4$/Zr(On-Pr)$_4$ mixed metal ceramer films. Two sol-gel precursors, Ti(O-i-Pr)$_4$ and Zr(On-Pr)$_4$ in a 1:1 ratio, were combined with linseed oil. Unlike the individual sol-gel precursors present in linseed oil, a different trend in the tensile properties was observed. The maximum tensile strength of 8.4 MPa was observed at 4 wt. % $Ti(O-i-Pr)_4:Zr(On-Pr)_4$ loading. The tensile modulus also maximized at 4 wt. % $Ti(O-i-Pr)_4:Zr(On-Pr)_4$ with a value of 65.6 MPa. The strain-at-break maintained approximately 50% strain throughout the series until the sol-gel precursors content increased beyond 10 wt. % after which a decrease in strain-at-break was observed.

Table IX shows the tensile strength, strain-at-break, and tensile modulus of another set of mixed metal-oxide ceramer coatings as a function of $Ti(O-i-Pr)_4$ and $Zr(On-Pr)_4$ content. In this series, $Ti(O-i-Pr)_4$ was held constant at 5 wt. % throughout while increasing $Zr(O-n-Pr)_4$ from 1–5 wt. %. The highest tensile strength (10.4 MPa) was obtained at $Ti(O-i-Pr)_4:Zr(O-n-Pr)_4$ 5:3 wt. % loading. The strain-at-break (25%) remained relatively constant throughout the series. These results indicate that the combined effects of the two sol-gel precursors provided a synergistic effect compared to the single sol-gel precursor-based ceramer coatings.

The synergistic effect can be observed when evaluating the mechanical properties. For example, when $Ti(O-i-Pr)_4$ or $Zr(O-n-Pr)_4$ was added as a single metal alkoxide to linseed oil, the hardness and adhesion properties increased, but the flexibility decreased as the sol-gel precursor content increased. However, when a mixture of $Ti(O-i-Pr)_4: Zr(O-n-Pr)_4$ was present in linseed oil, both the adhesion and hardness were enhanced while maintaining excellent impact resistance. It was found that $Ti(O-i-Pr)_4:Zr(O-n-Pr)_4$ mixture of 5:3 wt. % performed the best in this series by providing better impact resistance, flexibility, adhesion, and tensile properties relative to titanium-based ceramer coatings without the added $Zr(O-n-Pr)_4$.

The invention has been described with reference to various specific and preferred embodiments and techniques. The invention is not to be construed, however, as limited to the specific embodiments disclosed in the specification. It should be understood that many variations and modifications may be made while remaining within the spirit and scope of the invention.

TABLE II

Mechanical Properties of Inorganic/Organic Coatings

| Coating Comparison | Dry Film Thickness | Pencil Hardness | Reverse Impact Resist. | Concial Mandrel Flex. | X-Hatch Adhesion |
|---|---|---|---|---|---|
| Pure linseed oil | 48 μm | 3B | 40 in · lbs | ⅛" dia. | 5B |
| Linseed oil + | | | | | |
| TIP:ZrP(2) | 42 μm | 9H | 30 in · lbs | ⅛" dia. | 5B |
| TIP:ZrP(4) | 37 μm | 9H | 25 in · lbs | ⅛" dia. | 5B |
| TIP:ZrP(6) | 39 μm | 9H | 15 in · lbs | ⅛" dia. | 5B |

TABLE III

Mechanical Properties of Inorganic/Organic Coatings

| Coating Comparison | Dry Film Thickness | Pencil Hardness | Reverse Impact Resist. | Concial Mandrel Flex. | X-Hatch Adhesion |
|---|---|---|---|---|---|
| Pure linseed oil | 48 μm | 3B | 40 in · lbs | ⅛" dia. | 5B |
| LIN-TIP(5) | 42 μm | 3H | 10 in · lbs | ¼" dia. | 4B |
| + ZnAc(0.5) | 27 μm | 8H | 58 in · lbs | ⅛" dia. | 5B |
| ZnAc(1.0) | 28 μm | 8H | 52 in · lbs | ⅛" dia. | 4B |
| LIN-TIP(10) | 39 μm | 7H | 4 in · lbs | ¼" dia | 3B |
| + ZnAc(0.5) | 18 μm | 9H | 8 in · lbs | ¼" dia | 4B |
| ZnAc(1.0) | 22 μm | 9H | 10 in · lbs | ¼" dia | 5B |
| LIN-TIA(5) | 43 μm | 4H | 18 in · lbs | ⅛" dia. | 5B |
| + ZnAc(0.5) | 38 μm | 7H | 42 in · lbs | ⅛" dia. | 0B |
| ZnAc(1.0) | 42 μm | 5H | 40 in · lbs | ⅛" dia. | 0B |
| LIN-TIA(10) | 45 μm | 6H | 12 in · lbs | ¼" dia | 3B |
| + ZnAc(0.5) | 33 μm | 9H | 6 in · lbs | ⅛" dia. | 5B |
| ZnAc(1.0) | 33 μm | 9H | 8 in · lbs | ⅛" dia. | SB |
| Linseed oil + | | | | | |
| ZnAc(0.5) | 38 μm | 2B | 30 in · lbs | ⅛" dia. | 4B |
| ZnAc(1.0) | 40 μm | 2B | 30 in · lbs | ⅛" dia. | 4B |

TABLE IV

Mechanical Properties of Inorganic/Organic Coatings

| Coating Comparison | Dry Film Thickness | Pencil Hardness | Reverse Impact Resist. | Concial Mandrel Flex. | X-Hatch Adhesion |
|---|---|---|---|---|---|
| Pure linseed oil | 70 μm | 3B | 40 in · lbs | ⅛" dia. | 5B |
| Linseed + | | | | | |
| ZrP(1) | 90 μm | 2B | 40 in · lbs | ⅛" dia. | 1B |
| ZrP(2) | 80 μm | HB | 40 in · lbs | ⅛" dia. | 2B |
| ZrP(3) | 80 μm | F | 33 in · lbs | ⅛" dia. | 1B |
| ZrP(4) | 70 μm | F | 35 in · lbs | ⅛" dia. | 1B |
| ZrP(5) | 70 μm | 1H | 30 in · lbs | ¼" dia. | 1B |
| Linseed + | | | | | |
| TIP(1) | 90 μm | F | 20 in · lbs | ⅛" dia | 4B |
| TIP(2) | 90 μm | 2H | 25 in · lbs | ⅛" dia | 4B |
| TIP(3) | 90 μm | 3H | 22 in · lbs | ¼" dia | 4B |
| TIP(4) | 80 μm | 4H | 20 in · lbs | ¼" dia | 4B |
| TIP(5) | 70 μm | 5H | 20 in · lbs | ¼" dia. | 4B |
| TIP(10) | 70 μm | 6H | 10 in · lbs | ¼" dia. | 4B |

TABLE V

Mechanical Properties of Inorganic/Organic Coatings

| Coating Comparison | Dry Film Thickness | Pencil Hardness | Reverse Impact Resist. | Concial Mandrel Flex. | X-Hatch Adhesion |
|---|---|---|---|---|---|
| Linseed oil | 80 μm | 3B | 40 in · lbs | ⅛" dia | 5B |
| Linseed oil + | | | | | |
| TIP:ZrP(1) | | 4H | 32 in · lbs | ⅛" dia | 5B |
| TIP:ZrP(2) | 80 μm | 3H | 30 in · lbs | ⅛" dia | 5B |
| TIP:ZrP(3) | 80 μm | 7H | 26 in · lbs | ⅛" dia | 5B |
| TIP:ZrP(4) | 65 μm | 6H | 20 in · lbs | ¼" dia | 5B |
| TIP:ZrP(5) | 70 μm | 6H | 10 in · lbs | ¼" dia. | 4B |
| TIP:ZrP(10) | 80 μm | 7H | 8 in · lbs | ¼" dia. | 4B |
| LIN-TIP(5) + | | | | | |
| ZrP(1) | 75 μm | 5H | 34 in · lbs | ⅛" dia | 5B |
| ZrP(2) | 70 μm | 6H | 30 in · lbs | ⅛" dia | 5B |
| ZrP(3) | 65 μm | 7H | 20 in · lbs | ¼" dia | 4B |
| ZrP(4) | 70 μm | 7H | 16 in · lbs | ¼" dia | 4B |
| ZrP(5) | 50 μm | 7H | 8 in · lbs | ¼" dia | 4B |

TABLE VI

Properties of Ti(O-i-Pr)$_4$/Linseed Coatings

| Wt % Ti(Oi-Pr)$_4$ | Tensile Strength (MPa) | Strain-at-Break (%) | Tensile Modulus (MPa) |
|---|---|---|---|
| 0 | 1.2 | 58 | circa 2 |
| 1 | 1.3 | 52 | circa 3 |
| 2 | 1.5 | 48 | 3.5 |
| 3 | 1.9 | 43 | 4.5 |
| 4 | 2.3 | 42 | 9.5 |
| 5 | 2.8 | 22 | 10 |
| 10 | 5.0 | 23 | 33 |

TABLE VII

Properties of Zr(O-n-Pr)$_4$/Linseed Coatings

| Wt % Zr(O-n-Pr)$_4$ | Tensile Strength (MPa) | Strain-at-Break (%) | Tensile Modulus (MPa) |
|---|---|---|---|
| 0 | 1.2 | 58 | 2.1 |
| 1 | 1.0 | 49 | 2.0 |
| 2 | 1.5 | 46 | 3.0 |
| 3 | 1.5 | 43 | 3.8 |
| 4 | 1.5 | 38 | 4.4 |
| 5 | 1.5 | 42 | 5.7 |

TABLE VIII

Tensile Properties of TIP:ZrP(1:1 wt. %)/Linseed Coatings

| Wt. % TIP:ZrP | Tensile Strength (MPa) | Strain-at-Break (%) | Tensile Modulus (MPa) |
|---|---|---|---|
| 0.5:0.5 | 1.6 | 45 | 5 |
| 1:1 | 4.0 | 46 | 22 |
| 1.5:1.5 | 6.2 | 56 | 24 |
| 2:2 | 8.2 | 51 | 66 |
| 2.5:2.5 | 3.8 | 48 | 40 |
| 5:5 | 4.0 | 42 | 30 |
| 7.5:7.5 | 0.2 | 8 | 6 |

TABLE IX

Tensile Properties of TIP:ZrP/Linseed Coatings

| Wt. % TIP:ZrP | Tensile Strength (MPa) | Strain-at-Break (%) | Tensile Modulus (MPa) |
|---|---|---|---|
| 5:1 | 5 | 26 | 45 |
| 5:2 | 6 | 32 | 45 |
| 5:3 | 10.5 | 17 | 235 |
| 5:4 | 8.5 | 26 | 120 |
| 5:5 | 4.0 | 42 | 30 |

What is claimed is:

1. A ceramer precursor coating composition comprising unsaturated oil stock having a drying index of at least about 65; and
sol-gel precursor which includes titanium sol-gel precursor and zirconium sol-gel precursor.

2. The coating composition of claim 1 wherein the unsaturated oil stock has an Iodine Number of at least about 130.

3. The coating composition of claim 1 wherein the unsaturated oil stock has an unsaturation index of at least about 1.5.

4. The coating composition of claim 1 wherein the unsaturated oil stock includes linseed oil, tung oil, perilla oil, sunflower oil, soybean oil, fish oil, dehydrated castor oil, or a mixture thereof.

5. The coating composition of claim 1 wherein the unsaturated oil stock has a fatty acid composition which includes at least about 25% linolenic acid.

6. The coating composition of claim 1 wherein the unsaturated oil stock has a fatty acid composition which includes at least about 60% linoleic acid.

7. The coating composition of claim 1 wherein unsaturated oil stock includes a fatty acid polyester of a plyol selected from the group consisting of pentaerythritol, dipentaerythritol, sorbitol, poly(vinyl alcohol), poly(allyl alcohol), α-methyl-O-glucoside, trimethylolalkane, and mixtures thereof.

8. The coating composition of claim 1 wherein the titanium sol-gel precursor includes titanium alkoxide.

9. The coating composition of claim 7 wherein the titanium alkoxide is selected from the group consisting of titanium tetraisopropoxide, titanium (di-isopropoxide)bis (aceylacetonate), and mixtures thereof.

10. The coating composition of claim 1 wherein the zirconium sol-gel precursor includes zirconium alkoxide.

11. The coating composition of claim 10 wherein the zirconium alkoxide includes zirconium tetra-n-propoxide.

12. The coating composition of claim 1 comprising at least about 80 wt. % of the unsaturated oil stock.

13. The coating composition of claim 1 comprising no more than about 12 wt. % of the sol-gel precursor.

14. The coating composition of claim 1 comprising the titanium sol-gel precursor and the zirconium sol-gel precursor in a wt. ratio of about 10:1 to about 1:5.

15. The coating composition of claim 14 comprising titanium alkoxide and zirconium alkoxide in a wt. ratio of about 5:1 to about 1:2.

16. The coating composition of claim 1 comprising at least about 85 wt. % of an unsaturated oil stock having a drying index of at least about 70 and no more than about 10 wt. % of a sol-gel precursor which includes titanium tetra-i-propoxide and zirconium tetra-n-propoxide in a wt. ratio of about 2:1 to about 1:1.

17. A method of producing a substrate having a ceramer coating comprising:
(a) applying a coating composition on at least one surface of the substrate to form a coated substrate, wherein the coating composition includes (i) unsaturated oil stock and (ii) sol-gel precursor which includes titanium sol-gel precursor and zirconium sol-gel precursor; and
(b) curing the coated substrate to form a ceramer coating on the surface.

18. The method of claim 17 wherein the curing step comprises heating the coated substrate.

19. A substrate having a ceramer coating on at least one surface, wherein said ceramer coating is formed from a mixture which includes; (i) an unsaturated oil stock; and (ii) sol-gel precursor which includes titanium sol-gel precursor and zirconium sol-gel precursor.

20. A ceramer precursor coating composition comprising an unsaturated oil stock;
sol-gel precursor which includes titanium sol-gel precursor and zirconium sol-gel precursor.

21. The coating composition of claim 20, said coating composition forming, upon curing, a ceramer coating having a tensile strength of at least about 8 MPa.

22. The coating composition of claim 20, said coating composition forming, upon curing, a ceramer coating having a tensile modulus of at least about 40 MPa.

23. The coating composition of claim 20, said coating composition forming, upon curing, a ceramer coating having a strain-at-break of at least about 15%.

24. The coating composition of claim 20, said coating composition forming, upon curing, a ceramer coating having a reverse impact resistance of at least about 20 in-lb.

25. The coating composition of claim 20, said coating composition forming, upon curing, a ceramic coating having a pencil hardness of at least about 6H.

26. The coating composition of claim 20, said coating composition forming, upon curing, a ceramer coating having a conical mandrel flexibility of no more than about ¼" diameter.

27. The coating composition of claim 20, said coating composition forming, upon curing, a ceramer coating having an X-hatch adhesion of at least about 4B.

* * * * *